United States Patent Office 3,420,573
Patented Jan. 7, 1969

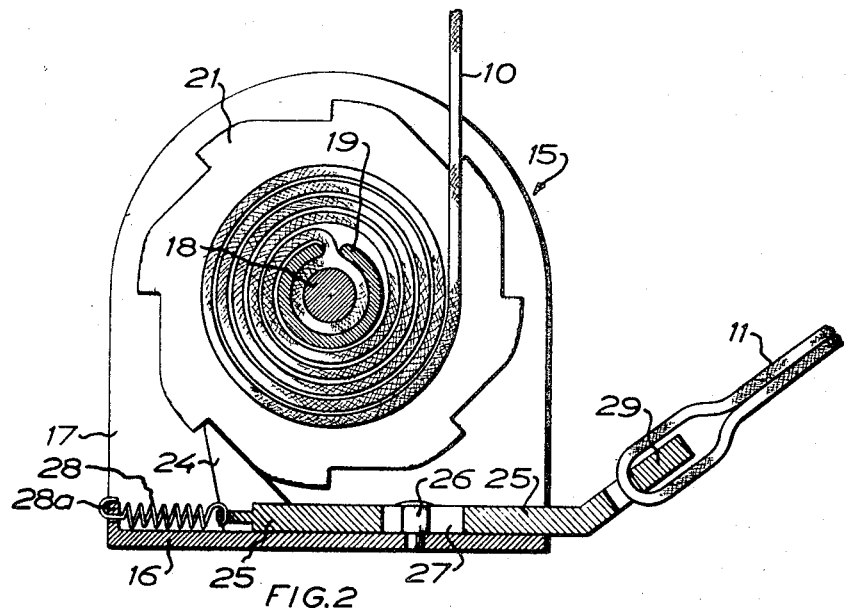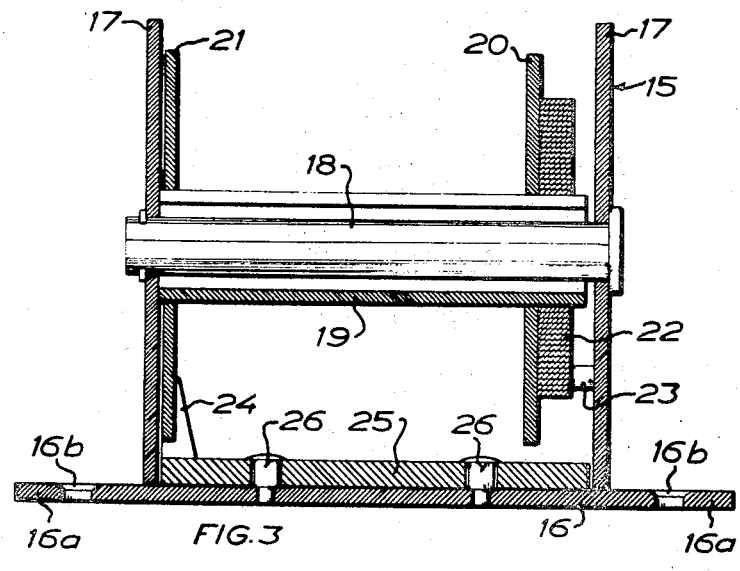

3,420,573
THREE-POINT SAFETY SEAT BELT FOR MOTOR CARS
Gote Eskil Yngve Holmberg, Anderstorp, Sweden, assignor to G.E.Y.-Patenter Aktiebolag, Anderstorp, Sweden
Filed May 23, 1967, Ser. No. 640,613
Claims priority, application Sweden, May 27, 1966, 7,288/66
U.S. Cl. 297—389     5 Claims
Int. Cl. A62b *35/00; 35/02;* B60r *21/10*

ABSTRACT OF THE DISCLOSURE

A three-point safety belt having a chest strap and a hip strap anchored in a motor car is provided with a retractor mounted at an anchorage point of one of the straps to retract such strap and with a latch which is operatively connected to the other strap and is engageable with the retractor by a pull in said other strap to prevent withdrawal of said one strap from the retractor.

---

An important aspect of safety seat belts for motor cars is that they should be easy and convenient to manipulate, thus making them more popular in use and apt to overcome the reluctance of the motorists to use them also for short trips. In other words, no complicated and time-consuming adjusting operations should be required to cause the belt to take a correct position of use, and of course the belt should not restrict the freedom of motion of the seat occupant in any way. This ease and convenience, however, must not of course be attained to the detriment of safety and must not result in too heavy an increase of the price of the belts. It has thus been suggested, in safety seat belts having a hip strap and a chest strap, to provide a strap retracting mechanism for retraction of the chest strap, but one here encounters the problem of safely latching the strap retracting mechanism at the moment of a collision. This problem has been solved by arranging a manually operable catch which has to be released to permit length adjustment of the chest strap by automatic winding of the strap onto the strap retracting mechanism or by manual unwinding of the strap from said mechanism, or by providing the strap retracting mechanism with a latching device responsive to inertia or centrifugal force. The embodiments, hitherto developed, of such manual or automatic strap retracting mechanisms, have not won the undivided approval of authorities and experts, and they have not either found any broad acceptance on the market.

This invention relates to a safety seat belt for motor cars comprising a chest strap and a hip strap and a spring-biased strap retracting mechanism for retraction of one strap. According to the invention, the strap retracting mechanism is mounted at an anchorage point common to the chest strap and the hip strap for retraction of said one strap to said anchorage point, and a latching device comprised in said strap retracting mechanism is operatively connected with the other strap in order to be moved into latching engagement by a pull at said strap. When a safety seat belt of this construction is in position of use its chest and hip straps as a rule are stretched over the body of the seat occupant so that said other strap thus keeps the strap retracting mechanism latched, but said mechanism can easily be released by the seat occupant slackening said other strap whereby he is given the desired freedom of motion inasmuch as such strap can be freely wound onto and unwound from the strap retracting mechanism. If at the use of the seat belt said other strap should be sufficiently slack to keep the latching device out of latching engagement, said other strap at a collision will be subjected at an early stage to such a force as to produce at once latching of the strap retracting mechanism.

These features of the invention and the advantages gained thereby will appear from the following description in which reference is made to the accompanying drawings illustrating an embodiment of the invention. In the drawings:

FIGURE 2 is a cross sectional view of the strap retracting mechanism comprised in said safety seat belt;

FIGURE 3 is an axial sectional view of the strap retracting mechanism.

Figure 1:
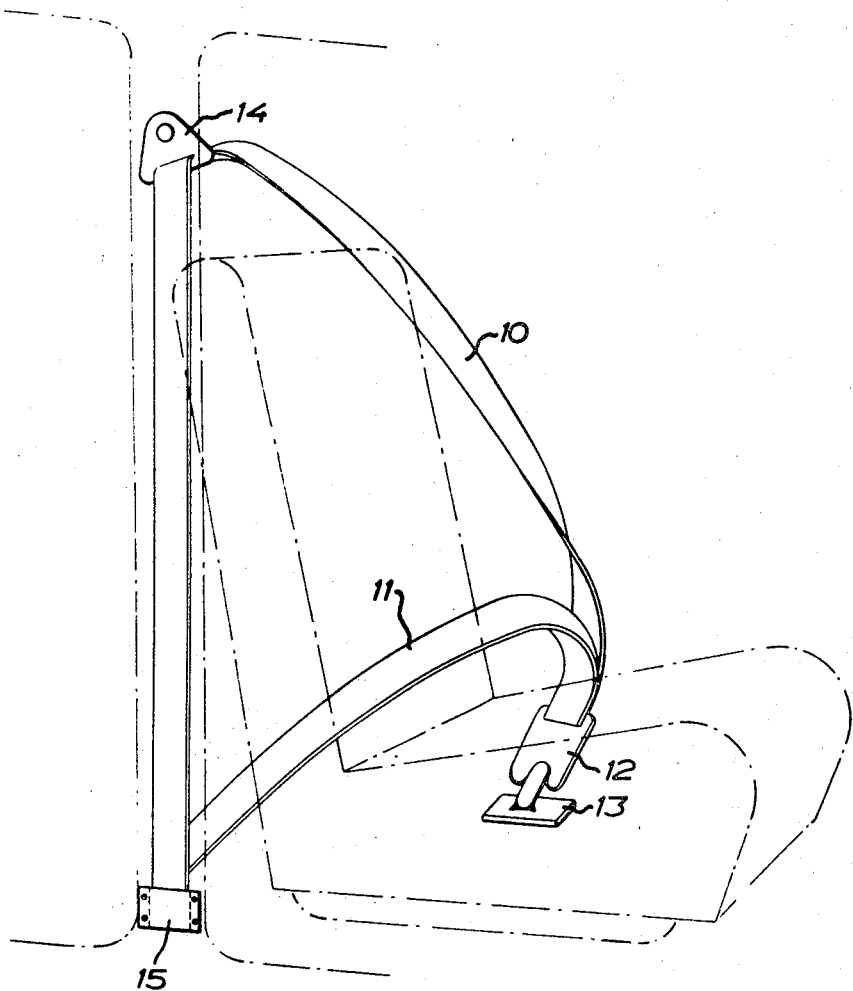
FIGURE 1 is a perspective view of a car seat and a safety seat belt arranged in accordance with the invention.

The three-point safety seat belt illustrated includes a chest strap 10 and a hip strap 11 together constituting a continuous loop and running through a hook member 12 which is detachably connected together with a yoke member 13 secured in the motor car as a fixed abutment. The chest strap 10 extends through a fitting 14 pivotally mounted at shoulder level to the door pillar of the motor car and continues down along said door pillar to a strap retracting mechanism 15 anchored in the motor car. The hip strap 11 also extends to said strap retracting mechanism. How the straps are associated at said mechanism will appear from FIGURES 2 and 3 of the drawings, which show the strap retracting mechanism and the straps connected thereto on a larger scale.

The illustrated embodiment of the strap retracting mechanism is a prototype which permits of various modifications in regard of construction and design without departing from the principles essential to the invention.

The strap retracting mechanism comprises a U-shaped frame having a web 16 and limbs 17 and can be rigidly secured in the motor car in that the web of said mechanism with the aid of flanges 16*a* projecting therefrom is screwed fast to the motor car by means of screws which are passed through holes 16*b* in said flanges. Rotatably mounted in bearings in the limbs 17 is a shaft 18 which bridges the distance between the limbs and which has mounted thereto a strap roller comprising a core 19 and a pair of flanges 20 and 21 projecting from said core. A spirally coiled spring 22 mounted on the core 19 outside the flange 20 is secured with one end to the core 19 and with the other end to one limb 17 by means of a pin 23. The chest strap 10 has one end secured in a conventional manner to the core 19, and the spring 22 is under bias to drive the strap roller in such a sense that the chest strap 10 is wound onto said roller to the extent said strap is slackened. The flange 21 is shaped as a ratchet wheel in that notches are provided in the periphery of the flange, and a pawl 24 coacts with said ratchet wheel. The pawl 24 is rigidly connected or integral with a planar slide 25 which is movably guided on the web 16 by means of a pair of headed pins 26, in the form of screws or rivets, which are passed through slots 27 in the slide 25. The slide is loaded by means of a tension spring 28 which is interposed between a lug 28*a* upstanding from the web 16 and one end of the slide. The spring 28 tends to keep the pawl 24 disengaged from the ratchet wheel 21, but the pawl can be engaged with said ratchet wheel (as shown in FIGURE 2) against the action of the tension spring 28 by a pull being exerted at the other end of the slide. Such pull can be exerted by means of the hip strap 11 which is secured in the slide 25 at a slitted lug 29 formed at said other end of the slide.

Provided that the spring 28 is sufficiently strong to keep the pawl 24 disengaged from the ratchet wheel 21 against the pull that can be exerted by the spring 22 in the hip strap 11 via the chest strap 10 interconnected therewith, the chest strap 10 can be lengthened by unwinding it from the strap roller 19–21 under simultaneous tensioning of the spring 22 and shortened by winding it onto the strap roller by the action of said latter spring at calm and controlled movements of the seat occupant's upper body, for which reason the seat occupant feels entirely free and has the possibility, without being restricted by the seat belt, to reach for the controls, cubbyhole etc. of the car. Should the pawl 24 have been brought to latching position by stretching of the hip strap 11 and thereby prevents a movement of the chest strap the seat occupant can easily cause the pawl to go to release position by pulling in his diaphragm.

In spite of this freedom for the seat occupant the three-point seat belt according to the invention in a fully satisfactory manner prevents the seat occupant from being thrown against the windshield of the car at a collision or heavy deceleration. During the initial part of a heavy deceleration of the seat occupant he will be displaced on the seat whereby the hip strap 11 will be put under tension. As a result the pawl 24 on the slide 25 will be pulled with a jerk into engagement with the ratchet wheel so that the chest strap 10 cannot possibly unwind when the seat occupant's upper body is subsequently thrown forward. There is no risk that the jerk at the hip strap will be transmitted to the strap retracting mechanism via the chest strap before said mechanism has been latched, instead of causing the vitally important engagement of the pawl, since the friction between the loop formed by the chest and hip straps and the hook member at the resulting jerk will be sufficiently great in order that there will be no such transmission of the jerk.

Alternatively, however, the spring 28 can be so weak that the spring 22 is capable of keeping the pawl 24 engaged with the ratchet wheel 21 by the pull acting via the chest strap 10 and the hip strap 11. In such a case the safety seat belt is always in ready position to keep the seat occupant to his seat at a collision or heavy retardation. Should the seat occupant desire to have freedom of motion he must slacken the hip strap 11 by pulling in his diaphragm simultaneously as he manually retains the chest strap 10 so that the slackening effect is not equalized via said chest strap to the strap retracting mechanism but instead results in that the spring 28 can pull the pawl 24 out of engagement with the ratchet wheel 21.

It is also possible to have the chest strap 10 act upon the latching device and to arrange the hip strap 11 as the strap that can be retracted by the strap retracting mechanism. If the seat occupant wishes to lengthen the continuous loop formed by the hip strap and the chest strap he must in such a case slacken the chest strap 10 so that the pawl 24 is disengaged from the ratchet wheel by the action of the spring 28, whereupon the hip strap 11 can be withdrawn from the strap retracting mechanism 15 and the chest strap 10 can be lengthened by the loop being pulled through the hook member 12.

While a preferred embodiment of the invention has been described in the foregoing and illustrated in the drawings, it will be readily understood by those skilled in the art that the invention can be modified in various ways within the scope of the appended claims, particularly in regard of the construction of the strap retracting mechanism proper.

What I claim and desire to secure by Letters Patent is:

1. In a motor car a three-point safety belt comprising a chest strap anchored in the car, a hip strap anchored in the car, retracting mechanism mounted at an anchorage point of one of said straps and including means biasing said retracting mechanism to retract automatically said one strap to said anchorage point, latching means engageable with said retracting mechanism to prevent the withdrawal of said one strap from said retracting mechanism, and means operatively connecting said latching means with said other one of said straps to bring said latching means into engagement with said retracting mechanism by a pull at said other strap.

2. In a motor car a three-point safety belt as claimed in claim 1 further comprising spring means biasing said latching means to disengage said latching means from said retracting mechanism.

3. In a motor car a three-point safety belt as claimed in claim 2 in which said chest and hip straps form a continuous loop and in which said spring means is adapted to apply on said latching means a force sufficient to maintain said latching means disengaged against the action of the force applied by said biasing means of said retracting mechanism on said latching means via said chest and hip straps.

4. In a motor car a three-point safety belt as claimed in claim 2 in which said chest and hip straps form a continuous loop and in which said biasing means of said retracting mechanism is adapted to apply on said latching means via said chest and hip straps a force sufficient to maintain said latching means engaged against the action of the force applied on said latching means by said spring means.

5. In a motor car a three-point safety belt as claimed in claim 1 in which said one strap is the chest strap and said other strap is the hip strap.

References Cited

UNITED STATES PATENTS

| 2,971,730 | 2/1961 | Martin | 244—122 |
|---|---|---|---|
| 3,043,625 | 7/1962 | Bohlin | 297—389 |
| 3,258,293 | 6/1966 | Sharp | 297—389 |
| 3,294,447 | 12/1966 | Riley | 297—388 |
| 3,286,946 | 11/1966 | Board et al. | 297—388 X |
| 3,348,881 | 10/1967 | Weman | 297—388 |

CASMIR A. NUNBERG, *Primary Examiner.*

U.S. Cl. X.R.

297—388; 242—107.4